United States Patent [19]

Lewis

[11] E Re. 30,790

[45] Reissued Nov. 10, 1981

[54] UNIVERSAL JOINT LUBRICATION

[75] Inventor: David S. Lewis, Defiance, Ohio

[73] Assignee: The Zeller Corporation, Defiance, Ohio

[21] Appl. No.: 22,740

[22] Filed: Mar. 22, 1979

Related U.S. Patent Documents

Reissue of:

[64] Patent No.: 3,832,865
Issued: Sep. 3, 1974
Appl. No.: 357,206
Filed: May 4, 1973

[51] Int. Cl.[3] ..... F16D 3/26

[52] U.S. Cl. ..... 64/17 A; 64/23; 308/207 R

[58] Field of Search ..... 64/17 A, 17 R, 17 SP, 64/23; 308/207

[56] References Cited

U.S. PATENT DOCUMENTS

| | | | |
|---|---|---|---|
| 1,577,268 | 3/1926 | Tarbox | 64/17 R |
| 1,841,349 | 1/1932 | Culbertson | 64/17 R |
| 2,040,002 | 5/1936 | Jones | 64/17 R |
| 3,204,428 | 9/1965 | Stokely | 64/17 A |
| 3,470,711 | 10/1969 | Kayser | 64/17 A |
| 3,592,022 | 7/1971 | Stokely | 64/17 A |
| 3,721,110 | 3/1973 | Borneman | 64/17 A |
| 3,901,049 | 8/1975 | Herscovici | 64/17 A |

FOREIGN PATENT DOCUMENTS

| | | | |
|---|---|---|---|
| 691079 | 5/1953 | United Kingdom | 64/17 A |

OTHER PUBLICATIONS

Dana Journal Cross Design 5-5-168X.

*Primary Examiner*—Ira S. Lazarus
*Assistant Examiner*—Magdalen Moy
*Attorney, Agent, or Firm*—Wegner, Stellman, McCord, Wiles & Wood

[57] ABSTRACT

Improved lubrication of bearing cups in universal joints is provided. A cross of a universal joint has four trunnions extending therefrom along two mutually perpendicular lines. Bearing cups are rotatably received on the trunnions and the cups in turn are held by universal joint yokes. Lubrication passages extend from a central portion of the cross outwardly toward the ends of the trunnions. When the universal joint is stationary, lubricant such as grease may drain from an upper bearing cup down to a lower cup, leaving the upper cup devoid of lubrication when the universal joint is again placed in operation. In accordance with the invention, a cavity is in the end of each trunnion communicating with the bearing cup and a passage extension extends substantially through the cavity from the lubrication passage toward the end of the trunnion. Lubricant is trapped in an annular space formed between the passage extension and the wall of the cavity with this lubricant being readily available to lubricate the corresponding cup when the universal joint is placed in operation.

4 Claims, 5 Drawing Figures

UNIVERSAL JOINT LUBRICATION

Matter enclosed in heavy brackets [ ] appears in the original patent but forms no part of this reissue specification; matter printed in italics indicates the additions made by reissue.

This invention relates to the lubrication of universal joints.

A typical universal joint includes a cross having four trunnions extending outwardly therefrom along two mutually perpendicular lines. Bearing cups are received on the trunnions and rotatably mounted thereon, typically by needle bearings. The bearing cups in turn are held in pairs of arms of two mutually perpendicular yokes, each connected to a separate component of a drive train. Commonly, the cross has internal lubrication passages extending from a central portion thereof outwardly toward the ends of the trunnions, with a grease fitting located in the central portion and communicating with the four passages. When the universal joint is installed on a vehicle and has been in continuous operation for a period of time, the grease therein can be quite hot and correspondingly be of low viscosity. If the universal joint is stopped and remains stationary for a time, the grease can drain from one or two of the bearing cups in an upper position down through the cross passages and to the lower cups. When the vehicle is again started and the universal joint revolves, the upper cup or cups may be deprived of adequate lubrication for some period of time. The grease which has drained to the lower cup or cups may remain there, particularly if the grease has cooled and has once again become relatively viscous, or if the grease tends to be urged outwardly toward the cup or cups to which it is drained by virtue of centrifugal force due to rotation of the universal joint.

An attempt has been made to overcome this problem by placing a check valve device in each of the lubrication passages extending from the central portion of the cross to the trunnions. These were designed to enable grease to flow outwardly toward the trunnions but not in the opposite direction. However, grease in the central portion of the cross would not pass through the check valves to the trunnions under the force of gravity and even centrifugal force may not have been sufficient to overcome the resistance of the devices, at least in all instances. Also, when grease was forced into the passages through the central grease fitting, sometimes the grease would not reach all of the trunnions, particularly if a wide variation existed in the amount of force needed for the grease to pass the check valve devices. Also, occasionally such devices were deficient in their manufacture so that openings were not properly formed therethrough. In such an instance, no grease would ever pass through and the life of the universal joint was accordingly short.

The universal joint according to the invention retains grease in the trunnions at the upper bearing cups when the universal joint is stationary and the grease is hot. However, there are no valves or similar restrictions involved which can cause such problems as those discussed above. Rather, in accordance with the invention, the cross passages terminate in cavities at the ends of the trunnions and passage extensions communicate with those passages and extend substantially through the cavities to points near the ends of the trunnions. The passage extensions then hold grease in the annular spaces formed between the passage extensions and the internal surface of the cavities so that when the universal joint is rotated once again, the grease is present at such upper bearing cups to be available for lubrication almost immediately.

It is, therefore, a principal object of the invention to provide a universal joint with lubrication provisions having the advantages and none of the disadvantages discussed above.

Many other objects and advantages of the invention will be apparent from the following detailed description of preferred embodiments thereof, reference being made to the accompanying drawings, in which.

Figure 1:
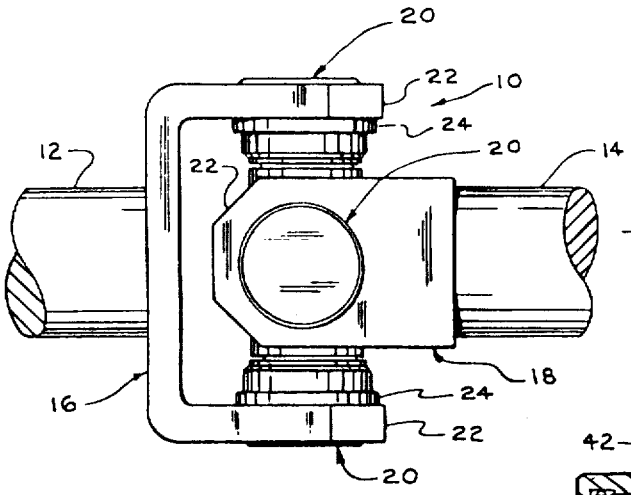
FIG. 1 is a side view in elevation of a universal joint embodying the invention.

Referring to FIG. 1, a universal joint embodying the invention is indicated at 10 and connects driving and driven members 12 and 14 in the usual manner. The joint 10 includes two yokes 16 and 18 disposed at mutually perpendicular angles with bearing cups 20 held in arms 22 of the yokes 16 and 18 by retaining rings 24 or other suitable means.

Figure 2:
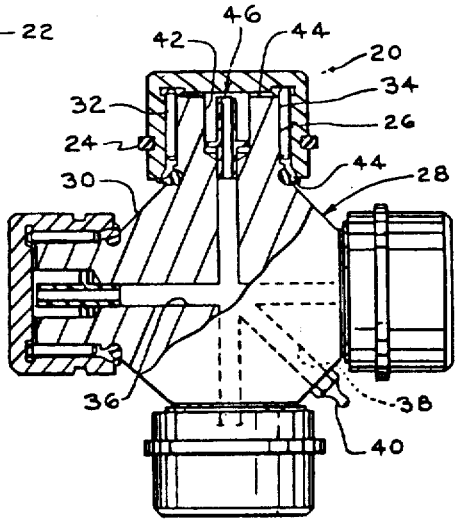
FIG. 2 is a front view in elevation of a cross and bearing cups of the universal joint, with parts broken away and with parts in cross section.

Referring more particularly to FIG. 2, the bearing cups 20 are rotatably mounted on trunnions 26 of a cross member 28 with the trunnions 26 extending outwardly from a body 30 of the cross member. Needle bearings 32 are located between the interior of the cups 20 and outer cylindrical bearing surfaces 34 of the trunnions 26.

Lubrication passages 36 extend outwardly from a central portion of the body 30 toward the trunnions 26. A supply passage 38 communicates with four lubrication passages 36 and terminates in an external lubrication fitting 40 by means of which grease or other suitable lubricant can be supplied to the passages 36 periodically. The passages 36 communicate with cavities or recesses 42 centrally located in the trunnions 26 so that grease can flow through the passages 36 and the cavities 42 to the interior of the cups 20. The ends of the trunnions 26 can have grooves 44 extending outwardly therefrom to aid in the passage of the grease, or plastic discs having grooves therein can be located between the trunnion ends and the cups. The grease travels outwardly through the grooves 44 to lubricate the needle bearings 32, with the grease being retained in the cups by resilient seals 44, which can be of a type shown in Zeller U.S. Pat. No. 3,091,948.

In universal joints heretofore known, after the vehicle with which the joint is used has been in operation for a period of time and is then stopped, one or even two of the trunnions 34 are in upper positions relative to the others. With the grease being hot due to the operation of the vehicle and the operation of the universal joint 10, it has a relatively low viscosity, with the result that the grease can drain down through the respective passages 36 and into the lower cup or cups. When the vehicle is again operated, the grease will have cooled off and become more viscous, tending to remain in the cup or cups to which it has drained. Further, centrifugal force acting on the universal joint 10 tends to retain the grease in that cup or cups. This results in the upper cup or cups not receiving lubrication, at least during initial resumed operation of the universal joint, with the result that wear is greatly accelerated.

Heretofore, one-way valve devices were placed in the lubrication passages 36 to enable lubricant to flow outwardly to the trunnions but not in the opposite direction. Unfortunately, such devices required so much pressure to enable flow therethrough, that only the force of a grease gun was sufficient to force the lubrication through the valve devices to the trunnions. Consequently, after the universal joint was lubricated, grease in the trunnion cavities 42 was not always replenished because the force of gravity and even centrifugal force may not have been sufficient to assure that more grease would pass through the valve devices to the cavities. When the universal joint was lubricated, it was also possible that one or more of the trunnion cavities 42 would not receive grease unless care was exercised by the mechanic to assure that grease was forced into all four of the bearing cups 20. In addition, some of the one-way valve devices were on occasion manufactured without any openings therethrough, with the result that no grease could pass therethrough under any circumstances.

Figure 3:
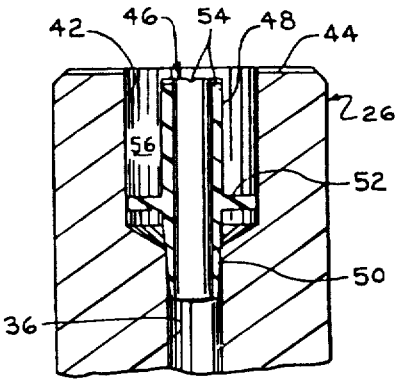
FIG. 3 is an enlarged view of a trunnion and a passage extension of the universal joint of FIG. 2.

In accordance with the invention, a passage extension indicated at 46 is located in each of the cavities 42. Referring particularly to FIG. 3, the passage extension 46 includes a tubular portion 48 which serves as an extension of the passage 36, extending into and substantially through the recess or cavity 42. In the embodiment of FIG. 3, the passage extension 46 has a tapered end 50 which is frictionally received in the end of the lubrication passage 36 to aid in holding the extension 46 therein. While it is not essential in all cases, in this instance the extension 46 further has a transversely-extending annular flange 52 which centers the extension 46 and helps position it in the cavity 42. The flange also aids in orienting the extension 46 in the cavity 42 during manufacturing when the extensions 46 are automatically fed to an assembly point. The tubular portion 48 also can have short passages or notches 54 in the outer end thereof. In the event that the extension 46 should become loose in the passage 36 and move outwardly by centrifugal force so that the end of the tubular portion 48 abuts the bottom of the cup 20, nevertheless, the grease can still flow out of the extension.

The extension 46 has no restrictions corresponding to the one-way valve devices heretofore employed so that grease can pass substantially uninhibited from the center of the cross body 30, through the passage 36, through the extension 46, and into the cavity 42. At this time, even if the grease is quite hot and the trunnion 26 is stopped in an upper position, the grease is retained in an annular space indicated at 56 formed between the cylindrical inner surface of the cavity 42 and the outer cylindrical surface of the tubular portion 48. When the universal joint is again placed in motion, this grease is substantially immediately available to lubricate the needle bearings 32 in the cup 20.

Figure 4:
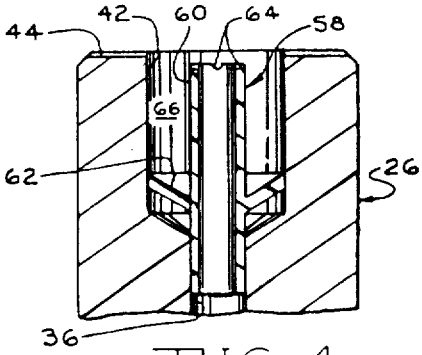
FIG. 4 is a view similar to FIG. 3 of a trunnion and a modified passage extension.

Referring to FIG. 4, the trunnion 26 has a modified passage extension 58 in the cavity 42. The extension 58 includes a tubular portion 60 with a transversely-extending flange 62 which is of a conical configuration with the concave side facing toward the outer end of the trunnion. The inner end of the tubular portion 60 has a relatively loose fit in the passage 36 while the outer edge of the flange 62 has a friction fit with the inner surface of the cavity 42. Again, short passages or notches 64 can be located in the end of the tubular portion 60 to enable passage of lubricant if the extension becomes loose and moves out against the bottom of the cup 20. The flange 62 is preferably located near the bottom of the cavity 42 to provide a maximum annular space 66 for the grease. The tolerances for the lubrication passage 36 are usually closer than those for the cavities 42. Consequently, the friction fit of the tapered end 50 of the passage extension 46 in the passage 36 may be preferred to the friction fit of the flange 62 of the extension 58 in the cavity 42.

Figure 5:
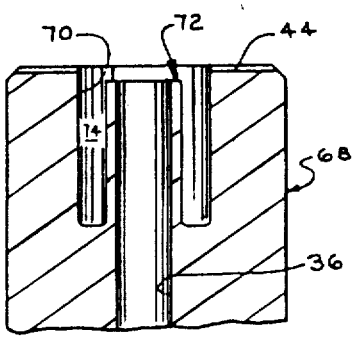
FIG. 5 is a view similar to FIG. 3 of a modified trunnion and a passage extension.

Referring to FIG. 5, a modified trunnion 68 has a cavity 70 therein and a passage extension 72 in the cavity 70 is formed integrally with the trunnion 68. The cavity 70 and the passage extension 72 can be formed at the same time by means of a trepanning tool, by way of example. The integral extension 72 preferably extends substantially through the cavity 70, in the same manner as the extensions 46 and 58, and forms an annular space 74 to retain grease in the same manner as is achieved with the extensions 46 and 58. The passage extension 72, being structurally integral with the trunnion 68, is made of metal. However, in a preferred form, the passage extensions 46 and 58 are made of plastic from a cost standpoint and because the lighter weight plastic is less affected by centrifugal force tending to move the extensions outwardly.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A cross for a universal joint comprising a body forming four trunnions extending therefrom along two mutually perpendicular lines, passages in said body from a central portion thereof to positions near the ends of said trunnions, a cavity in the end of each of said trunnions communicating with one of said passages, and passage extensions communicating with the passages and extending into said cavities, said passage extensions having substantially cylindrical outer surfaces forming annular lubricant reservoirs with said cavities, *means at the outer ends of the trunnions providing passageways between the outer portion of each lubricant reservoir and the outer cylindrical bearing surface of the trunnion, said lubricant reservoirs having a volume in excess of the passageways.*

2. A cross according to claim 1 characterized by each of said passage extensions terminating short of the end of the corresponding trunnion, each of said passage extensions having means cooperating with the corresponding trunnion to resist outward movement of said extension toward the outer end of the trunnion.

[3. A cross for a universal joint comprising a body forming a trunnion extending therefrom, said trunnion having a cavity formed centrally in the end thereof, said body having a passage communicating with said cavity, and tubular wall means extending from the end of said passage at the entrance to said cavity through a substantial portion of said cavity to a location near the end of said trunnion, said tubular wall means forming an annular lubricant reservoir with said cavity over at least most of the length of said tubular wall means.]

[4. A cross according to claim 3 characterized by said wall means being made of a plastic material, and having a substantially uniform cross section throughout most of its length.]

[5. A cross according to claim 3 characterized by said wall means having a transversely-extending flange extending substantially to the inner surface of said cavity.]

[6. A cross according to claim 5 characterized by said flange having a force fit with the surface of said cavity.]

[7. A cross according to claim 3 characterized by said wall means having an end portion extending into said passage.]

[8. A cross according to claim 7 wherein said portion of said wall means extends into said passage with a force fit.]

9. A universal joint comprising a cross having trunnions extending outwardly therefrom, a bearing cup rotatably mounted on each of said trunnions, each of said trunnions having a substantially cylindrical cavity formed therein communicating with the interior of the corresponding bearing cup, said cross having passages extending from a central portion thereof and communicating with each of said cavities, and wall means extending through a substantial portion of each of said cavities and communicating with the passages in said cross, said wall means being spaced from the surface of the corresponding cavity throughout substantially the entire length of said wall means *to form lubricant reservoirs extending therearound, means at the outer ends of the trunnions providing passageways between the outer portion of each lubricant reservoir and the outer cylindrical bearing surface of the trunnion, said lubricant reservoirs having a volume in excess of the passageways.*

[10. A universal joint according to claim 9 characterized by each of said wall means having a transverse flange extending to the inner surface of the corresponding cavity.]

[11. A universal joint according to claim 9 characterized by said wall means having a portion extending into the corresponding passage.]

[12. A cross according to claim 2 characterized by each of said passage extensions having at least one notch in its outer end.]

[13. A cross for a universal joint comprising a body forming a trunnion extending therefrom, said trunnion having a cavity formed centrally in the end thereof, said body having a passage communicating with said cavity, and tubular wall means extending from the end of said passage at the entrance into said cavity through a substantial portion of said cavity to a location near the end of said trunnion, said wall means being structurally integral with said body.]

14. A universal joint comprising a cross having trunnions extending outwardly therefrom, a bearing cup rotatably mounted on each of said trunnions, each of said trunnions having a cavity formed therein communicating with the interior of the corresponding bearing cup, said cross having passages extending from a central portion thereof and communicating with each of said cavities, and wall means extending through a substantial portion of each of said cavities and communicating with the passages in said cross *to form a lubricant reservoir defined by the outer portion of said wall means and the inner surface of said cavities*, said wall means being structurally integral with said cross, *means at the outer ends of the trunnions providing passageways between the outer portion of each lubricant reservoir and the outer cylindrical bearing surface of the trunnion, said lubricant reservoirs having a volume in excess of the passageways.*

* * * * *